(12) United States Patent
Torrealba et al.

(10) Patent No.: US 11,479,713 B2
(45) Date of Patent: Oct. 25, 2022

(54) POLYMER-BASED ENHANCED OIL RECOVERY WITH COMPOSITIONALLY-TUNED SLUGS

(71) Applicant: KING ABDULLAH UNIVERSITY OF SCIENCE AND TECHNOLOGY, Thuwal (SA)

(72) Inventors: Victor Antonio Torrealba, Thuwal (SA); Hussein Ali Hoteit, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/264,875

(22) PCT Filed: Jun. 20, 2019

(86) PCT No.: PCT/IB2019/055220
§ 371 (c)(1),
(2) Date: Feb. 1, 2021

(87) PCT Pub. No.: WO2020/030996
PCT Pub. Date: Feb. 13, 2020

(65) Prior Publication Data
US 2021/0301192 A1    Sep. 30, 2021

Related U.S. Application Data

(60) Provisional application No. 62/774,500, filed on Dec. 3, 2018, provisional application No. 62/716,753, filed on Aug. 9, 2018.

(51) Int. Cl.
*C09K 8/588* (2006.01)
*E21B 43/16* (2006.01)

(52) U.S. Cl.
CPC .............. *C09K 8/588* (2013.01); *E21B 43/16* (2013.01)

(58) Field of Classification Search
CPC ....................................................... E21B 43/26
See application file for complete search history.

(56) References Cited

U.S. PATENT DOCUMENTS 3,827,499 A    8/1974 Norton et al.
4,266,611 A    5/1981 Bousaid et al.
(Continued)

FOREIGN PATENT DOCUMENTS

WO    2016164601 A1    10/2016

OTHER PUBLICATIONS

PCT International Search Report (Form PCT/ISA/210) for corresponding/related International Application No. PCT/IB2019/055220, dated Oct. 22, 2019.
(Continued)

*Primary Examiner* — Angela M DiTrani Leff
*Assistant Examiner* — Avi T Skaist
(74) *Attorney, Agent, or Firm* — Patent Portfolio Builders PLLC

(57) ABSTRACT

A method for selecting compositions of first and second slugs to be injected into an underground formation includes selecting a first salinity and a first polymer concentration for a first slug to be injected into a well; selecting a second salinity and a second polymer concentration for a second slug to be injected into the well; injecting the first slug into the well; and injecting the second slug into the well. The second slug is injected immediately after the first slug.

19 Claims, 10 Drawing Sheets

(56) References Cited

U.S. PATENT DOCUMENTS

| | | | |
|---|---|---|---|
| 10,106,726 B2 | 10/2018 | Ayirala et al. | |
| 2014/0262275 A1 | 9/2014 | Dean et al. | |
| 2015/0107841 A1 | 4/2015 | Suijkerbuijk et al. | |
| 2016/0061020 A1* | 3/2016 | Sayarpour | G01N 27/22 702/6 |
| 2016/0075936 A1* | 3/2016 | Wassing | E21B 43/16 166/400 |
| 2017/0204322 A1 | 7/2017 | Ayirala et al. | |

OTHER PUBLICATIONS

PCT Written Opinion of the International Searching Authority (Form PCT/ISA/237) for corresponding/related International Application No. PCT/IB2019/055220, dated Oct. 22, 2019.

Almansour Abdullah et al., "Efficiency of enhanced oil recovery using polymer-augmented low salinity flooding," Journal of Petroleum Exploration and Production Technology, vol. 7, Mar. 2017, pp. 1149-1158. DOI: 10.1007/s13202-017-0331-5.

Al-Qattan, Abrar et al., "Low Salinity Waterflood and Low Salinity Polymer Injection in the Wara Reservoir of the Greater Burgan Field," Society of Petroleum Engineers, Paper presented at the SPE EOR Conference at Oil and Gas West Asia, Muscat, Oman, Mar. 2018. DOI: 10.2118/190481-MS.

Alsofi, Abdulkareem et al., "SmartWater Synergy with Chemical EOR: Effects on Polymer Injectivity, Retention and Acceleration," Paper presented at the SPE EOR Conference at Oil and Gas West Asia, Muscat, Oman, Journal of Petroleum Science and Engineering, vol. 166, Mar. 2018, pp. 274-282. DOI: 10.2118/190394-MS.

Shiran, B.S. et al., "Enhanced Oil Recovery (EOR) by Combined Low Salinity Water/Polymer Flooding," American Chemical Society, Energy & Fuels, vol. 27, pp. 1223-1235. DOI: 10.1021/ef301538e.

Unsal, E. et al. "Low salinity polymer flooding: Lower polymer retention and improved injectivity," Journal of Petroleum Science and Engineering, vol. 163, Oct. 2017, pp. 671-682. DOI: 10.1016/J.PETROL.2017.10.069.

Vermolen, E.C. et al., "Low-Salinity Polymer Flooding: Improving Polymer Flooding Technical Feasibility and Economics by Using Low-Salinity Make-up Brine," Conference Proceedings, IPTC 2014: International Petroleum Technology Conference, Jan. 2014. DOI:10.3997/2214-4609-pdb.395.IPTC-17342-MS.

\* cited by examiner

DISTANCE FROM THE INJECTION WELL

POLYMER-BASED ENHANCED OIL RECOVERY WITH COMPOSITIONALLY-TUNED SLUGS

CROSS-REFERENCE TO RELATED APPLICATIONS

This application is a U.S. National Stage Application of International Application No. PCT/IB2019/055220, filed on Jun. 20, 2019, which claims priority to U.S. Provisional Patent Application No. 62/716,753, filed on Aug. 9, 2018, entitled "METHOD TO IMPROVE POLYMER INJECTIVITY AND EFFECTIVENESS FOR ENHANCED OIL RECOVERY," and U.S. Provisional Patent Application No. 62/774,500, filed on Dec. 3, 2018, entitled "POLYMER-BASED ENHANCED OIL RECOVERY WITH COMPOSITIONALLY-TUNED SLUGS," the disclosures of which are incorporated herein by reference in their entirety.

BACKGROUND

Technical Field

Embodiments of the disclosed subject matter generally relate to a system and method for oil reservoir recovery, and more specifically, to slug-based polymer injection processes that harness the mechanism of component acceleration during polymer transport in porous media, for boosting oil recovery over conventional continuous polymer flooding.

Discussion of the Background

Oil production involves extraction of oil from subsurface reservoirs. To increase the amount of the extracted oil, some oil production arrangements include an injection well located on one side of a subsurface reservoir and a production well located on the other side of the subsurface reservoir. FIG. 1 is a schematic diagram of such an arrangement. In this arrangement, a fluid, such as water 100, is typically injected into the injection well 102, with a pump 104. The water 100 generates a flood front 106 in the subsurface reservoir 108, which moves the oil towards the production well 110, where the oil is extracted.

However, a problem with injecting only water into the subsurface is that the water has a low viscosity and thus, it can pass the oil without effectively moving the oil toward the production well. To increase the viscosity of the water, a polymer may be added to the water prior to being pumped in the injection well. Such a process is called polymer flooding. Polymer flooding has been recognized as a promising technology to enhance oil recovery for over the past 50 years. The technology consists in the addition of polymers to the injection water to increase its viscosity. This increase leads to cross-flow at the reservoir scale, which improves sweep efficiency. Despite its promise, the polymer flooding has met mixed results at the field scale, especially in terms of injectivity.

Polymer injectivity has been recognized as one of the key technical difficulties that could be encountered for field-scale implementation of polymer flooding. For example, polymer injectivity has been tied to polymer solution rheology, polymer concentration, aqueous salinity, shear rate, temperature, pH, polymer adsorption, and mechanical entrapment. Injectivity issues are often attributed to polymer plugging. However, there is a lack of understanding of the mechanisms behind polymer plugging, which makes it challenging to test at the laboratory scale.

The effect of polymer as a viscosifying agent to improve oil recovery is typically taken for granted. However, a challenge in the design of a polymer flood is that of finding a polymer system that can achieve the desired viscosity conditions for oil recovery and which also will not result in significant polymer injectivity reduction. Therefore, polymer floods are typically designed with the highest possible viscosity that can be economically injected in the reservoir.

The typical economical life of an oil reservoir can be categorized into primary, secondary and tertiary production stages. During the primary production stage, the oil is flowing from the subsurface to the surface by the natural energy of the reservoir. As production declines, the secondary production stage is initiated, which consists of the injection of water to preserve reservoir pressure, which aids in the recovery of the oil. As the injection of the water reaches the production well, the fraction of water produced relative to the total produced volume of liquids increases rapidly, which is equivalent to an increased cost without a corresponding increase in oil production. The tertiary production stage (e.g., polymer flooding) addresses some of the inefficiencies of water injection and extends the economic life of the reservoir.

One such inefficiency is when the water viscosity is lower than the oil viscosity at the reservoir pressure and temperature conditions, which can lead to an unstable displacement (e.g., water fingering through the oil due to a viscous instability). One possible solution is the addition of polymer chemicals to the injection water, which raises the viscosity of the injection fluid. The economics of the project benefit from a typical incremental oil recovery of 5% to 15% of the original oil extraction with several years of production acceleration. However, the impact of polymer solution viscosity calls for a trade-off, since as the viscosity of the fluid injected into the well increases, the rate of polymer injection decreases, which may jeopardize the economics of the project.

In this regard, it is known that polymers are characterized by large molecules composed of many repeating smaller molecules that can be soluble in water. Mixing these polymers with the water can increase the water viscosity by several orders of magnitude. The viscosity of the water-polymer solution is a function of several parameters, such as the polymer concentration, water salinity and hardness, and temperature.

In enhanced oil recovery applications, the effectiveness of a polymer flood improves as both the viscosity of the polymer solution and its injection rate increase. Therefore, a successful polymer flood has to fulfill two competing requirements: 1) the polymer viscosity has to be high enough to maintain a stable displacement front (i.e., low water-oil mobility ratio), and 2) the injection rate at the well should be kept high enough to keep the project economical. The injection rate at the well, however, is inversely proportional to the polymer viscosity. In other words, at a given injection pressure, the higher the polymer viscosity, the lower the injection rate.

A major operational challenge for operating a well resides in the ability to inject a high-viscous polymer without significantly degrading the injection rate. The injection rate is defined as the volume of fluid that is pumped into the well for a given time period. Increasing the pumping pressure to boost the injection rate is not always a viable solution because of several constraints related to the reservoir rock integrity and polymer stability. In field applications, there is a minimum polymer injectivity that should be maintained to keep the project economically viable. Injecting the polymer below the minimum economic injection rate jeopardizes the success of the project. In practice, the selection of the polymer viscosity (i.e., concentration and salinity) is determined by the minimum economic injectivity. In conclusion, the polymer viscosity should be high enough to keep the polymer effective and low enough to keep the injectivity high. Fulfilling these two competing requirements is often challenging.

Thus, there is a need for a method that can maintain the viscosity of the fluid high-enough for efficiently sweeping the oil, and also that can keep the polymer viscosity low enough to not degrade the injection rate.

SUMMARY

According to an embodiment, there is a method for selecting compositions of first and second slugs to be injected into an underground formation. The method includes selecting a first salinity and a first polymer concentration for a first slug to be injected into a well; selecting a second salinity and a second polymer concentration for a second slug to be injected into the well; injecting the first slug into the well; and injecting the second slug into the well. The second slug is injected immediately after the first slug.

According to another embodiment, there is a system for sweeping a fluid from an underground formation. The system includes a processor configured to select a first salinity and a first polymer concentration for a first slug to be injected into a well, and select a second salinity and a second polymer concentration for a second slug to be injected into the well. The system further includes a pump controlled by the processor and configured to inject the first slug into the well and inject the second slug into the well. The second slug is injected immediately after the first slug.

According to still another embodiment, there is a non-transitory computer readable medium including computer executable instructions, wherein the instructions, when executed by a processor, implement instructions according to the method noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to oil recovery from a subsurface. However, these embodiments may also be used for sweeping other fluids from a porous media.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a method for increasing oil recovery from a well includes a step of injecting into the well at least two compositionally-tuned slugs, where the tuning design parameters include the polymer concentration and water salinity. The polymer concentration and salinity are selected such that the viscosity of both slugs are low enough to preserve high injection rates of the polymer. For example, this method uses a new polymer injection scheme that relies on the cyclical injection of low-salinity, low-concentration of polymer slugs followed by high-salinity, high-concentration of polymer slugs. This scheme eliminates the need for the trade-off between low-viscosity for maintaining the injection rates and high-viscosity for efficiently sweeping the oil. This scheme achieves two goals, (1) the viscosities in the near wellbore zones are low, which allows to preserve the high polymer injectivity, and (2) the in-situ viscosities of the slugs increase as the slugs move away from the wellbore, which improves the oil sweep efficiency. This is achieved by accelerating the polymer of the second slug relative to its salinity, so that the high-concentration of the polymer from the second slug merges/enters into a zone in which the low-salinity of the first slug dominates, which results in the mixing of the high-polymer concentration with the low-salinity. This mixing results in the high-viscosity of the mixing zone. Note that each slug includes a solution that is made of water, salt particles and at least one polymer.

Figure 1:
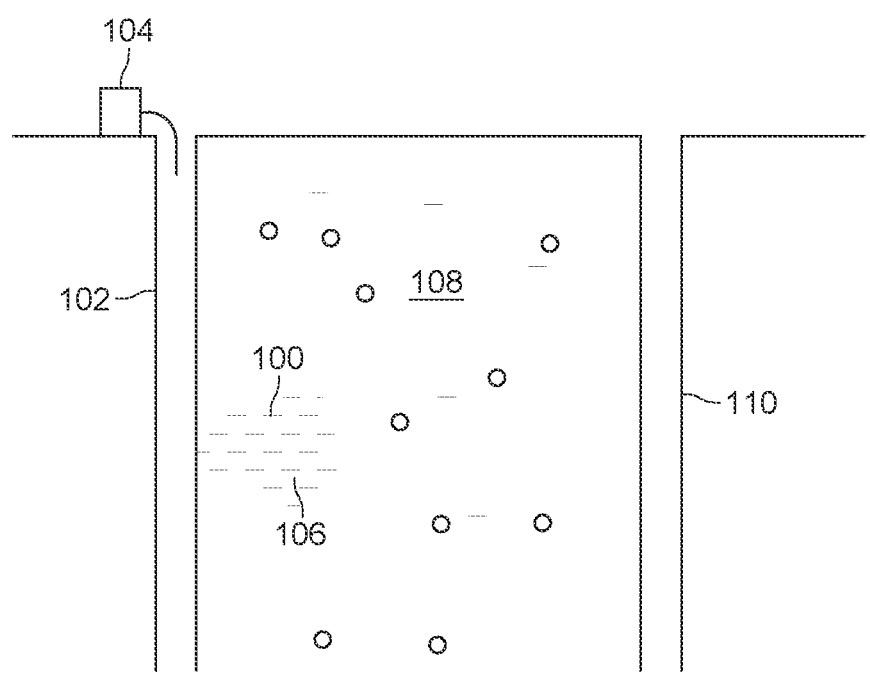
FIG. 1 is a schematic diagram of a conventional subsurface reservoir having an injection well and a production well.
Figure 2:
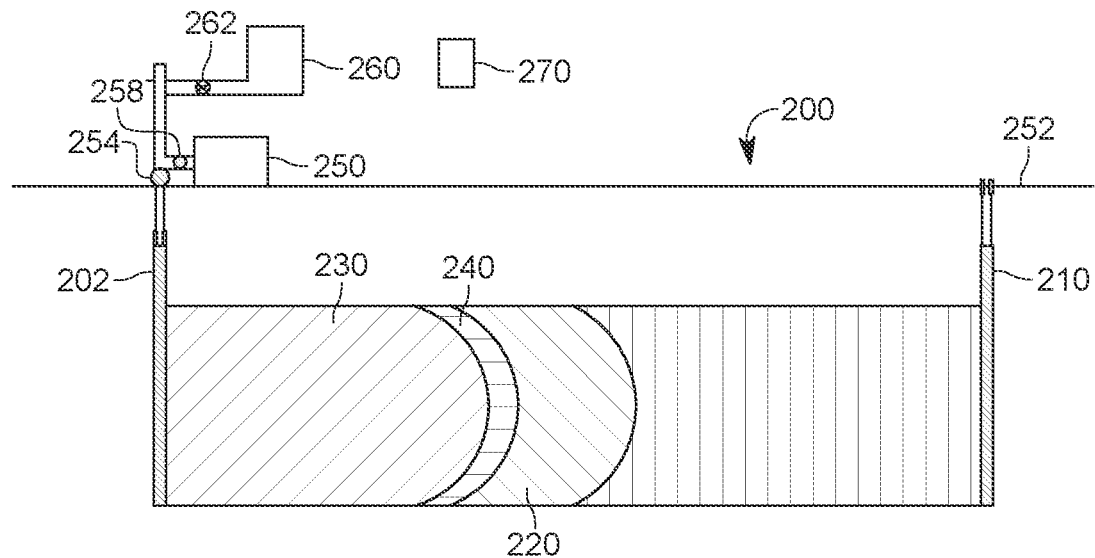
FIG. 2 illustrates a system that selects and injects first and second compositionally-tuned slugs into an injection well to sweep the oil.
Figure 3:
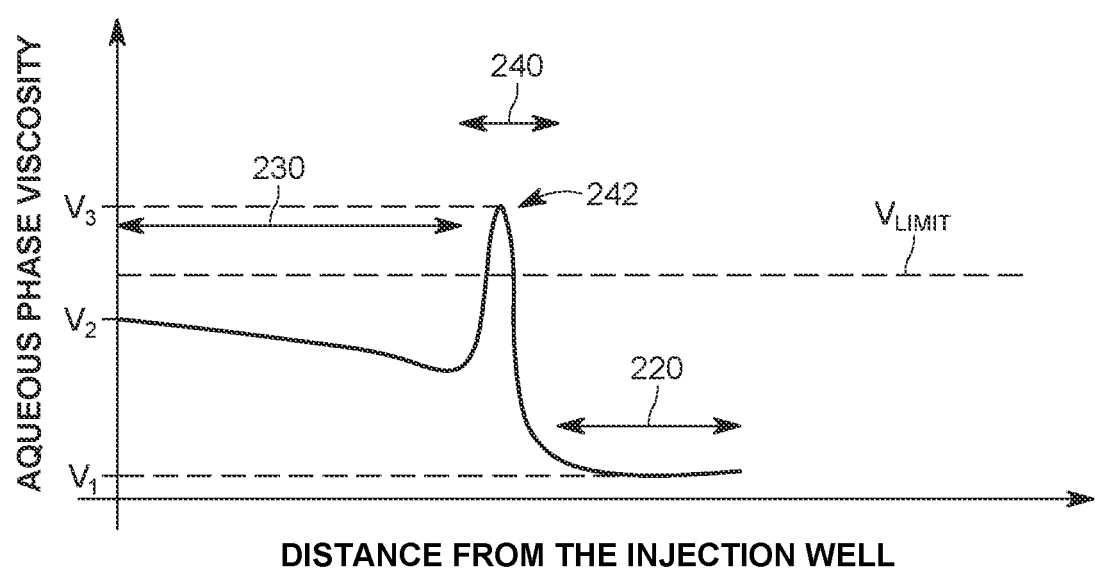
FIG. 3 illustrates the aqueous phase viscosity versus distance from the injection well for the first and second slugs and for a mixture zone.

This novel working scheme is schematically illustrated in FIGS. 2 and 3. FIG. 2 shows an oil recovery system 200 that includes an injection well 202 and a production well 210, similar to FIG. 1. Polymer flooding is performed in the injection well 202. However, different from the traditional polymer flooding, the compositionally-tuned slugs 220 and 230 have different salinities and different polymer concentrations. For example, as illustrated in FIG. 3, the first slug 220 has a first aqueous phase viscosity V1 while the second slug 230 has a second aqueous phase viscosity V2. In one application, V1 is equal to the water viscosity (i.e., zero polymer concentration) and V2 is larger than V1 (i.e., nonzero polymer concentration). In another application, V2 is larger than V1.

FIG. 2 shows a mixing zone 240 where the polymer part of the second slug 230 has accelerated, ahead of the salinity component of the second slug, and has mixed up with a part of the first slug 220, resulting in a high-concentration polymer in a low-salinity. As the viscosity of the polymer increases with an increased concentration of the polymer and a decreased salinity, the polymer viscosity reaches a peak value V3 242 in the mixing zone 240, as illustrated in FIG. 3.

Note that for pumping the polymer in the well in an economical way, a given pumping rate PR of the pump 254 at the injection well 202 is associated with a maximum viscosity $V_{LIMIT}$ for the polymer that is injected. In other words, if the viscosity of the polymer in the well or just around the well is larger than $V_{LIMIT}$, the pumping rate PR cannot be maintained and the pumping operation becomes less-economical. However, if the compositionally-tuned slugs 220 and 230 are used as indicated in FIGS. 2 and 3, i.e., having a viscosity V1 and V2 smaller than the viscosity $V_{LIMIT}$, the viscosity peak 242 in the mixing zone 240 becomes larger than the maximum viscosity $V_{LIMIT}$, which is desirable, at the mixing zone 240, which is located away from the well 202. In other words, with the process noted herein, low-viscosity (V1 and V2) slugs are injected from the injection well into the subsurface, maintaining the injection rate in a desired range, and at the same time, a high-viscosity value 242 is obtained away from the well, in the mixing zone 240. In this way, the high viscosity value 242 does not affect the injection rate.

The process of polymer acceleration experienced by the polymer in the second slug is now discussed in more detail. The subsurface is made of various rock types, having different porosities and sizes. The porosity of the rocks is typically described by the size of the pore. The oil and other fluids travel underground through these pores. The polymer that is injected into the subsurface is supposed to travel through these pores and flush out the oil, pushing it toward the production well. However, some of the pores may have a size smaller than the size of the polymer molecules. If this is the case, the inaccessible pore volume of the subsurface corresponds to the volume of the rock that cannot be reached by the polymer. This inaccessible volume is a function of the polymer molecular weight in relation to the pore size distribution of the reservoir rock. A typical inaccessible pore volume is around 20%. As the inaccessible pore volume increases, the polymer molecules advance faster than the salt molecules towards the production well because the polymer molecules are less deviated through those rock types with the small pore size. This explains why the polymer molecules experience acceleration relative to the salt molecules and in fact, why the polymer concentration is decoupled from the salinity for a given slug.

Because of the polymer acceleration phenomena, the polymer molecules in the trailing slug 230 will accelerate toward and into the leading slug 220, because these molecules move through the subsurface within a smaller fraction of the pore space, while the salt ions in the trailing slug 230 will move through all the pores. Therefore, there will be an intermediate (mixing) zone 240 between the trailing slug 230 and the leading 220 slug, where the polymer concentration corresponds to that of the trailing slug and the salinity corresponds to that of the leading slug. As a result, the polymer solution viscosity in the mixing zone is higher than both the trailing and leading slug viscosity, as illustrated in FIG. 3.

Figure 4:
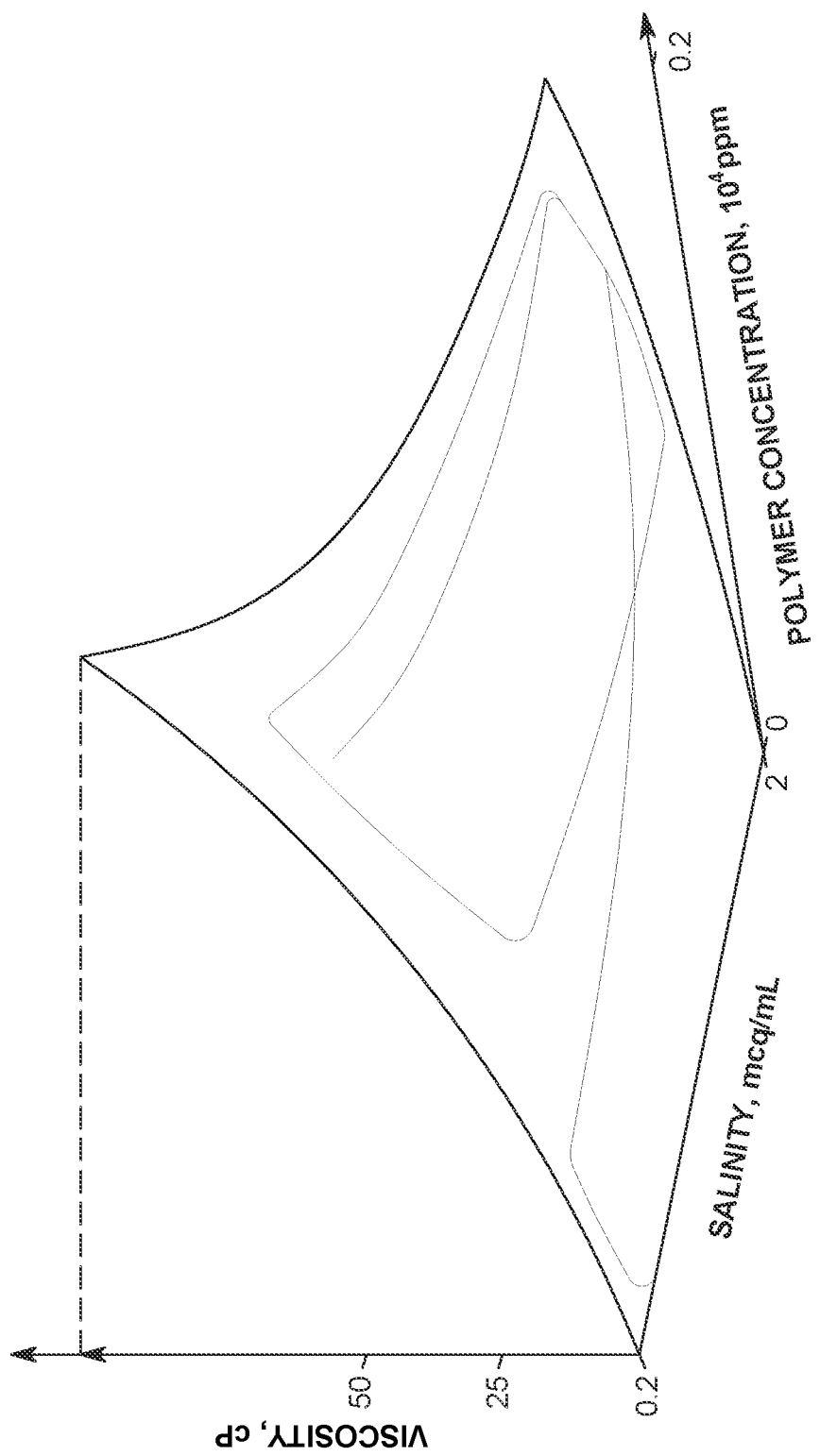
FIG. 4 illustrates a change in a viscosity of a polymer used for the first and second slugs versus a salinity and polymer concentration of the slugs.

The polymers to be used for the above discussed method are salinity-sensitive polymers, i.e., polymers that have an increased viscosity when the salinity is being reduced. The rheology of the salinity-sensitive polymers (e.g., partially hydrolyzed polyacrylamides (HPAM)) in aqueous solutions (water) is well-understood. The viscosity V of the solution or melt increases with an increase of polymer concentration PC and with a decrease of the salt content (salinity) S as illustrated in FIG. 4. For typical shear ranges encountered at the reservoir-scale in the subsurface, these solutions would exhibit a shear-thinning behavior (i.e., the solution viscosity decreases with an increase of the shear). This behavior is particularly useful for the deployment of polymer flooding in the field, since the highest shear rate would be encountered near the wells and hence, the decrease in viscosity would increase the polymer injectivity (injection rate).

In addition to viscosity, the polymer interaction with the rock of the subsurface impacts its transport through porous media. Polymer adsorption contributes to polymer retardation owing to the mass transfer from the polymer-rich aqueous phase to the solid rock phase. Polymer adsorption is known to be dependent on the aqueous phase salinity, and it is generally considered that the higher degree of adsorption occurs for higher salinity. This is likely due to polymer conformation modification in the presence of salts, which leads to an increased coiling, and a reduction in area per molecule resulting in increased adsorption. An increase in the salinity increases the solvent power of the solution, which results in reduced adsorption. Finally, the addition of salts contributes to counter ion competition with the polymer for adsorbing sites, also leading to decreased adsorption. It is known in the art a situation in which the adsorption was higher for high salinity conditions, while it is also known that the adsorption was higher for low salinity conditions. For some polymers, the salinity does not impact the adsorption, suggesting that the adsorption mechanisms are not significant in these systems, or their effects cancel. It is also known that HPAM retention for a micromodel system is lower at higher salinity conditions and that the effect of molecular weight on polymer adsorption follows a non-monotonic trend, with low adsorption for both low and high molecular weight (MW) and moderate adsorption for intermediate MW. It was showed that higher MW polymer would actually adsorb less and more slowly. If the adsorption is considered in this embodiment as the only polymer-rock interaction mechanism, and then proceed to inject into a reservoir a polymer solution at a salinity lower than the reservoir salinity, then the low salinity front would be ahead of the polymer front. This behavior is called polymer retardation.

As discussed above, the polymer-rock interaction mechanism is related to the inaccessible pore volume (IPV). The IPV can be assumed as the fraction of the pore space that polymer cannot access due to their entrance radii in relation to the polymer molecular size. It is believed that there are three mechanisms that may contribute to IPV. The first relates to the loss of entropy of the polymer chain as it moves from the bulk state to the confined, hence more orderly, porous media state. The second relates to the unsteady state mass transfer of polymer chains in dead-end pores. The third is the hydrodynamic exclusion of large polymer chains near pore walls, which results in an apparent inaccessible pore volume. If the IPV mechanism is considered to be the only polymer-rock interaction mechanism, and the injection described above with regard to FIGS. 2 and 3 is repeated, then the low-salinity front would be behind the polymer front. This behavior is called polymer acceleration In general, polymer transport is controlled by the interplay of adsorption and IPV. Based on the studies of the inventors, the benefit of the slug-based technology discussed herein over the traditional methods would be maximized for cases with maximum inaccessible pore volume and minimum adsorption in order to maximize the acceleration of the polymer component. The polymer MW is the parameter that controls both the inaccessible pore volume and the adsorption, and it should be selected to achieve sufficient polymer acceleration.

The compositionally-tuned polymer flooding process relies on the availability of a polymer whose viscosity can be adjusted by a change of the salt content in the slug (e.g., HPAMs, and to a lesser degree associative polymers) and a source of low salinity water, either from desalination or a near-surface fresh water reservoir. The two slugs 220 and 230 that are to be injected into the subsurface are injected sequentially in time, i.e., the leading slug 220 first and then the trailing slug 230. Note that these embodiments are discussed with regard to only two slugs. However, it is understood that these two slugs are repeated according to a sequence, which can include one or more pairs of these two slugs. In one application, three or more slugs may be defined to have a different polymer concentration and/or salinity and these three or more slugs may be injected according to a sequence that repeats the slugs. In still another application, the sequence may include a pair of two slugs, followed by three different slugs, followed again by a pair of two slugs and so on. Any combination of slugs may be used as long as at least two consecutive (in time) slugs are selected to have the different polymer concentration and/or salinity.

The leading slug 220, as previously discussed with regard to FIG. 3, may have a low salinity and a polymer concentration of zero or a low value, for example, lower than the polymer concentration of the trailing slug 230. In one embodiment, the leading slug 220 has a salinity corresponding to a low salinity source 250 (see FIG. 2) that is located at the subsurface 252, next to the head of the injection well 202. The leading slug 220 may have a polymer concentration such that the resulting solution viscosity of the entire slug is equal to the target viscosity (e.g., V1 in FIG. 3) to be achieved in the reservoir. From a practical point of view, the pump 254 is provided at the surface 252 to pump the water from the water tank 250, into the well 202. The water tank 250 may include low-salinity water, which is connected through a valve 258 to the head of the well 202. The low-salinity of the water may be selected to be lower than the salinity of the subsurface. Note that the salinity of the subsurface may be measured for each well. A polymer tank 260 is connected through a valve 262 to the flow of water. A controller 270 is connected to the pump 254 and the valves 258 and 262 for controlling the amount of water and the amount of polymer injected into the well 202. The controller 270 may be programmed to operate the pump and the valves so that trailing slug 230 has a salinity similar to the reservoir's salinity (i.e., produced water salinity) and a polymer concentration such that the resulting solution viscosity is equal to the target viscosity V2 to be achieved in the reservoir. For the process to be successful, the polymer-rock system should be selected in such a way to maximize polymer acceleration. Therefore, another viscosity of interest is that of the transition zone 240. This zone is defined as the zone where the high-polymer concentration PC2 from the trailing slug 230 moves well into the low-salinity concentration S1 of the leading slug 220. The maximum viscosity 242 in the transition zone 240 corresponds to the viscosity V3 of a polymer solution formed with the trailing slug polymer concentration PC2 and leading slug salt content S1. These concentrations are selected a priori to ensure that the transition zone viscosity is high enough so that the oil sweeping is effective, but also not high enough so that pore plugging will occur. Due to the nature of polymer transport in porous media, the transition zone 240 will be of negligible size near the injection well 202, and will grow in size as the interface between the two slugs 220 and 230 moves away from the injection well 202, which guarantees sufficiently high injectivity.

The injection of one leading slug and one trailing slug is considered herein to constitute one cycle. The size of the leading and trailing slugs can be selected so that the size (e.g., its volume) is a possible parameter of design optimization. In one application, the size of the slugs is about 5-10% of the reservoir pore volume in-between the injection-producer pair. In this regard, in one embodiment, it is desired the slugs to be large enough to maximize the transition zone 240 size away from the injection well 202 and to ensure that the salinity of the leading slug 220 is low enough after mixing with the reservoir brine. However, in this embodiment, it is also desired to maximize the number of transition zones in the reservoir, which means injecting a large-enough number of cycles (one to hundreds).

Figure 5:
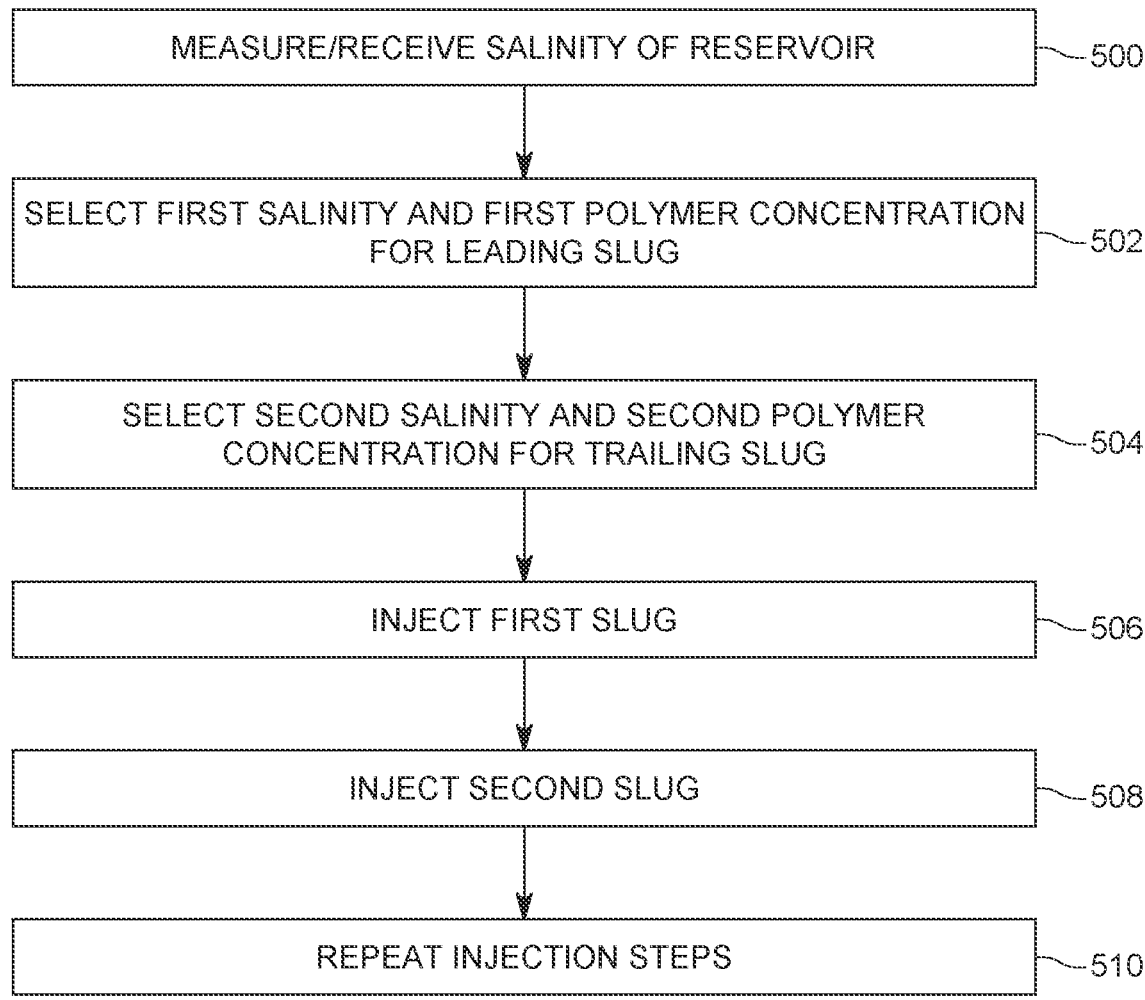
FIG. 5 is a flowchart of a method for selecting and injecting the first and second slugs into an injection well.

The process of injecting compositionally-tuned polymer slugs is now discussed with regard to the flowchart of FIG. 5. The method starts in step 500, in which the salinity of the reservoir brine is measured. In step 502, a first salinity S1 and a first polymer concentration PC1 of the leading slug 220 are selected so that a viscosity of the first slug has the desired value V1 when injected in the well. This viscosity value V1 is selected so that a rate of injection into the well is high enough to make the injection economically viable. In one application, the first salinity is selected to be lower than the salinity of the reservoir. In step 504, a second salinity S2 and a second polymer concentration PC2 of the trailing slug 230 are selected so that a viscosity of the second slug has the desired value V2 when injected in the well. This viscosity value V2 is selected so that a rate of injection of the second slug into the well is high enough to make the injection economically viable. The second salinity S2 value is selected, in one application, to be substantially equal (within 20%) to the value of the salinity of the reservoir measured in step 500. In one application, the first salinity S1 is selected to be smaller than the second salinity S2. In still another embodiment, the salinity values and the polymer concentrations are selected so that the viscosity value V1 of the leading slug is smaller than the viscosity value V2 of the trailing slug. In one application, the polymer concentration of the leading slug is zero. In still another application, the viscosity value V1 of the leading slug is equal to the viscosity value V2 of the trailing slug. Note that these selected viscosity values are maintained for as long as the slugs are in the injection well 202 or close to the injection well. As the slugs are moving through the oil reservoir, and the salinity of the slugs decouple from the polymer concentration, the viscosity values start to change, with the viscosity value of the transition zone 340 peaking at a value V3, which is larger than each of V1 and V2.

After the polymer concentrations and salinities of the various slugs have been determined, the first slug is injected in step 506 followed immediately by the injection of the second slug in step 508. Note that the controller 270 discussed with regard to FIG. 2 is configured to adjust the salinity and polymer concentrations at the head of the injection well 202. In this regard, in one application, it is possible to have two tanks with the polymer solutions at the selected concentrations (because it is preferred to age the solutions prior to injection so they polymer molecules have sufficient time to "hydrate," i.e., reach a steady-state conformation). Then, the controller simply selects one of the two tanks to inject the fluid as the first slug and then selects the other tank to inject the fluid as the second slug. In step 510, the controller repeats the steps 506 and 508 for a given number of times. It is possible to also configure the controller to repeat steps 502 to 508, so that new salinities and/or polymer concentrations are selected during the polymer flooding process. The controller 270 may perform a single cycle with the two slugs 220 and 230, or multiple cycles.

Various experiments have been performed for demonstrating the effectiveness of this new method. To assess the benefit of the proposed technology over the traditional alternatives, a reference process is defined that is consistent with the chemical requirements described earlier for the slug-based process. In these experiments, it is assumed that the continuous polymer injection is defined using the same polymer and salt mass as in the slug-based process. That is, the reference injection composition is kept constant at the average value of the leading and trailing slugs. For the cases considered, the solution's viscosity of the average composition is slightly lower than the separate slug viscosities, but not significantly lower.

Numerical results are now discussed for the continuous polymer flooding process (with no slugs) and the process discussed with reference to FIG. 5, i.e., composition-tuned slugs. The numerical results for the latter illustrate the influence of the adsorption. The numerical simulations are restrained to core-flood data obtained from the literature to emphasize the significance of both inaccessible pore volume and adsorption on the polymer transport through porous media. The simulations were performed for one-dimensional single-phase flows.

Figure 6A:
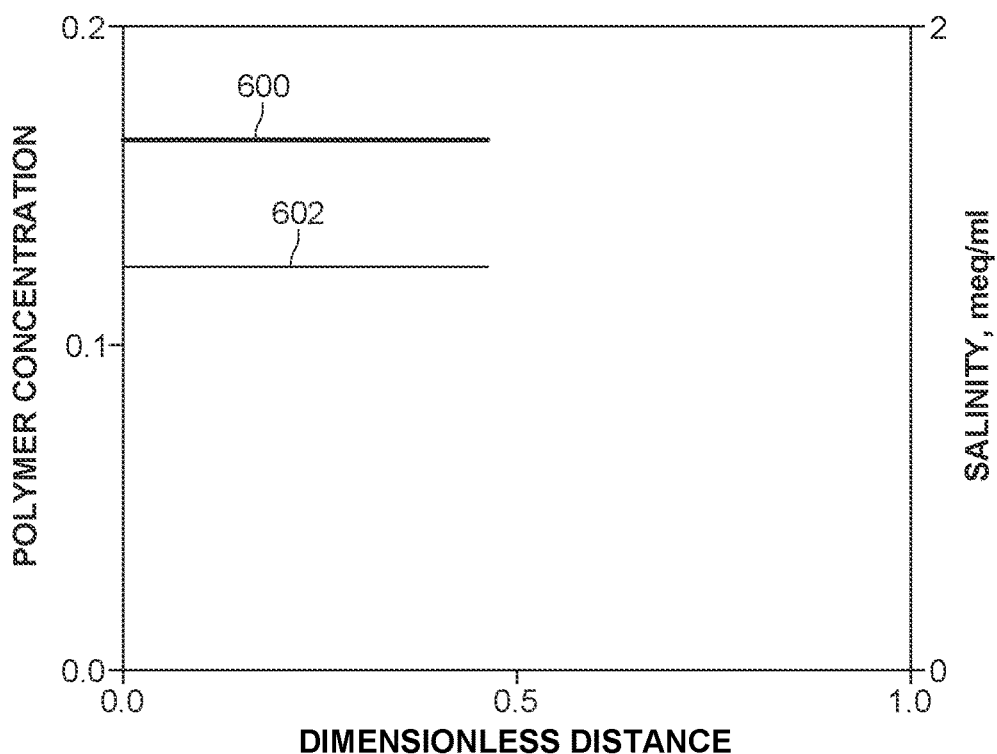
FIG. 6A illustrates the salinity and polymer concentration of a continuous polymer flooding operation.

The single-phase simulations in one dimension consider the polymer concentration PC and salinity S as a function of distance from the injection well 202, for a given time. In this regard, FIG. 6A shows a reference displacement where a single composition (polymer flood) having a polymer concentration 600 and a constant salinity 602 is injected continuously, without adsorption, into the well 202. The composition used for the continuous injection is selected such that it corresponds to the same mass of polymer and salt that are injected in the proposed slug process.

Figure 6B:
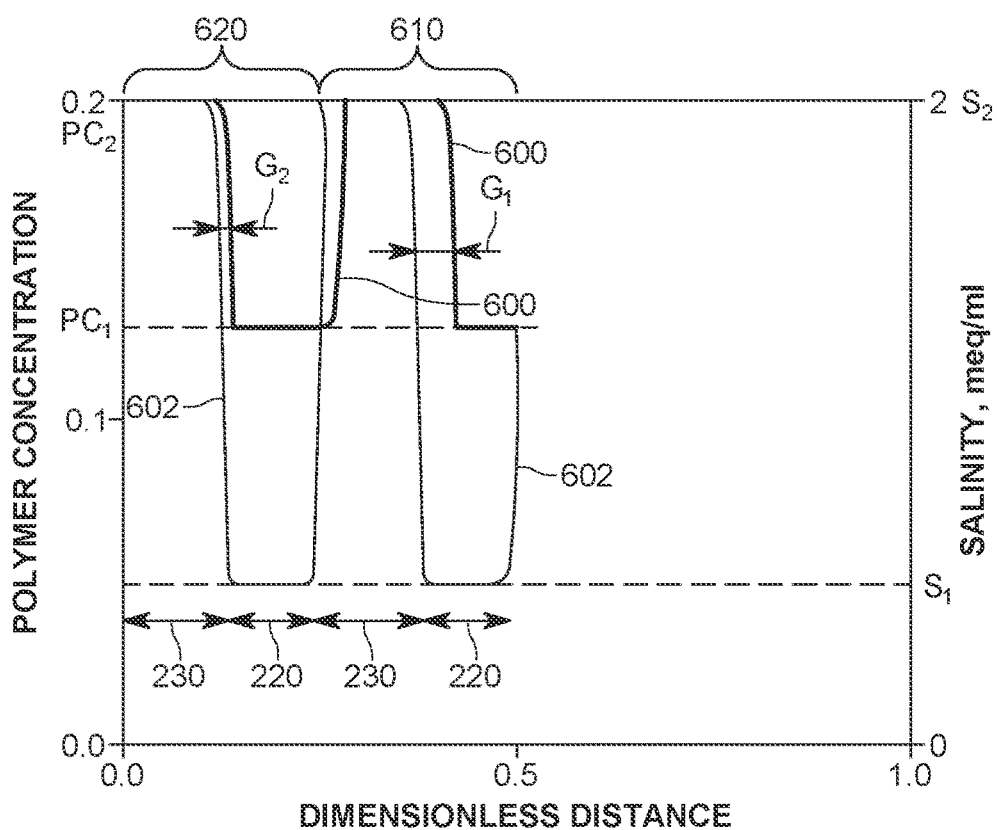
FIG. 6B illustrates the salinity and polymer concentration of a slug based polymer injection.

FIG. 6B show the case where two cycles 610 and 620 are considered, where each cycle uses two slugs 220 and 230, without adsorption. Each slug is represented by its polymer concentration (curve 600) and the salinity of the water (curve 602). It is noted that for the leading slug 220, the salinity S1 is lower than the salinity S2 for the trailing slug 230. It is also noted that for the leading slug 220, the polymer concentration PC1 is lower than the polymer concentration PC2 of the trailing slug 230. As the slugs move away from the injection point (represented by point (0,0) in FIG. 6B, it can be seen that the polymer concentration 600 (for the first cycle 610) moves ahead of the corresponding injected salinity 602 (still for the first cycle 610), thus forming a gap G1. This is equivalent with the polymer being decoupled from the water salinity, i.e., the polymer experiencing polymer acceleration relative to the salt of its slug.

For example, the leading slug 220 in the first cycle 610 is injected with lower salinity brine S1, but moves into the higher salinity of the reservoir, which leads to a lower viscosity. The concentration of the polymer in the trailing slug 230 of the first cycle 610 also moves ahead of its corresponding high salinity, which leads to an increase in the polymer solution viscosity. It was observed that for the second slug 230 of the second cycle 620, which is closer to the injection well than the first slug, the polymer has not had enough time for acceleration and therefore it does not significantly move ahead of its corresponding salinity, as shown by the gap G2. This is advantageous because this process ensures the injection process preserves a high rate because of the low viscosity of the polymer solution.

Figure 6C:
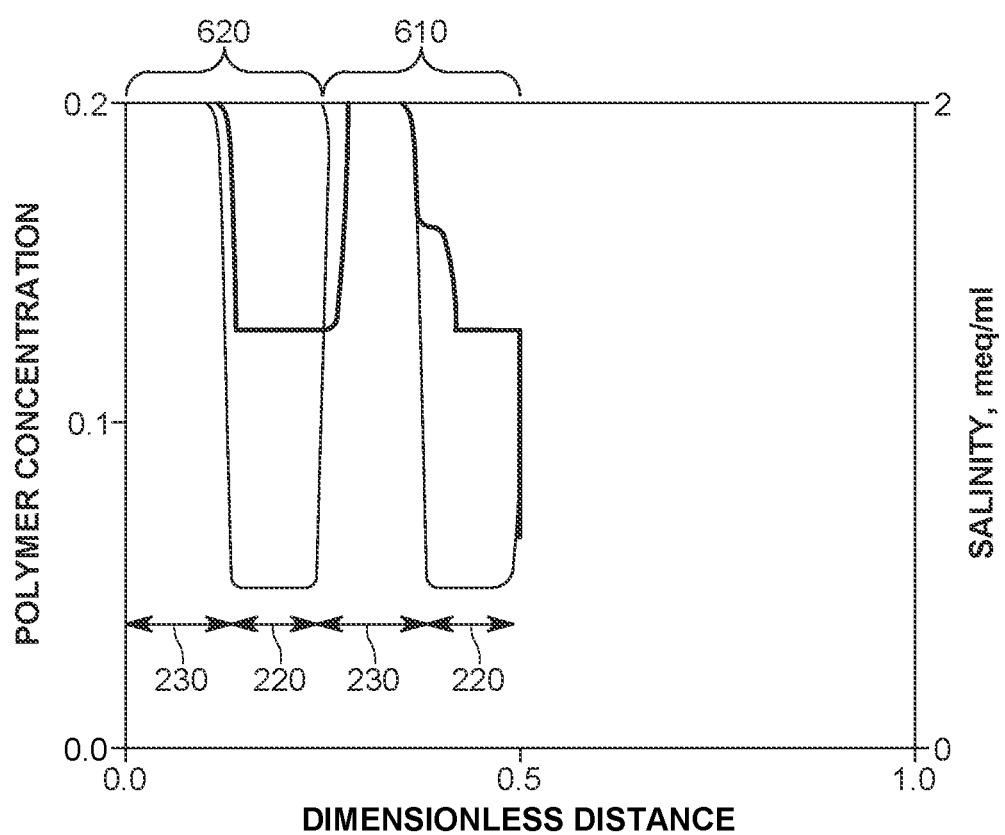
FIG. 6C illustrates the salinity and polymer concentration for a slug based polymer injection with adsorption.

FIG. 6C illustrates the same processes but considering the adsorption. Polymer adsorption in porous media is known to be dependent on salinity. It is typically considered that the higher the salinity, the higher the polymer loss into the rock. Because the polymer adsorption hinders the polymer acceleration, the process discussed in FIG. 5 would be most beneficial for cases where the adsorption is low, and the salinity effect on adsorption is not pronounced. For this case, the polymer concentration in the leading slug 220 of the first cycle 610 is completely adsorbed owing to the higher adsorption at the higher salinity conditions of the reservoir. However, once the adsorption is satisfied, the concentration profiles revert back to those observed in FIG. 6B.

Figure 7:
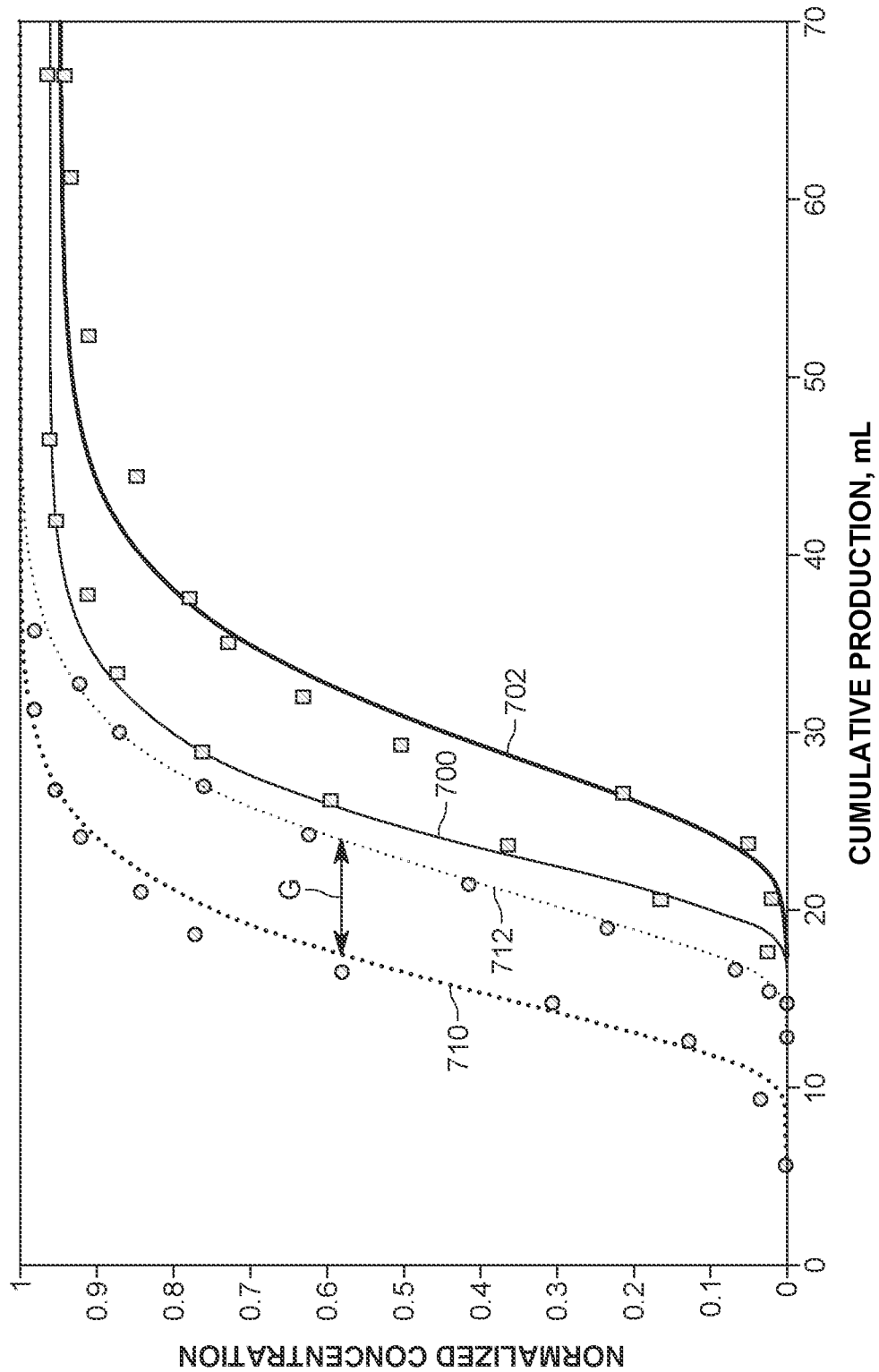
FIG. 7 illustrates the polymer retardation when adsorption occurs and the polymer acceleration processes when polymer adsorption has been satisfied.

A numerical experiment (which follows Hughes, D. S., Teeuw, D., Cottrell, C. W. and Tollas, J. M., 1990. "Appraisal of the use of polymer injection to suppress aquifer influx and to improve volumetric sweep in a viscous oil reservoir." SPE Reservoir Engineering, 5(01), pp. 33-40.) was conducted by the inventors to confirm that the polymer acceleration relative to the salinity works as discussed above. In this regard, FIG. 7 shows the normalized effluent concentration of the polymer and a tracer as a function of the cumulative produced volume for two injections into the same rock sample. The rock sample was used to simulate the subsurface, the polymer and salt were injected at one side of the sample (simulating the injection well), and the measurements were performed at an opposite side of the sample (simulating the production well). During the first injection (first cycle), which consists of the injection of water with polymer and the tracer (e.g., salt), it was observed that the tracer 700 is produced earlier than the polymer 702 (see FIG. 7). This is because the salt is non-adsorbing at the rock compared to the polymer. Because the polymer is strongly adsorbed during this experiment, it leads to polymer retardation (the opposite phenomena that is targeted with the process illustrated in FIG. 5). However, the same rock sample is flushed with water to displace the polymer and tracer from the pore space, and then the same cycle is repeated. In this case, the polymer 710 is produced earlier than the tracer 712, indicating that once adsorption is satisfied, the polymer can sufficiently accelerate and move ahead of the tracer (see gap G), as it moves through a smaller fraction of the pores.

Figure 8:
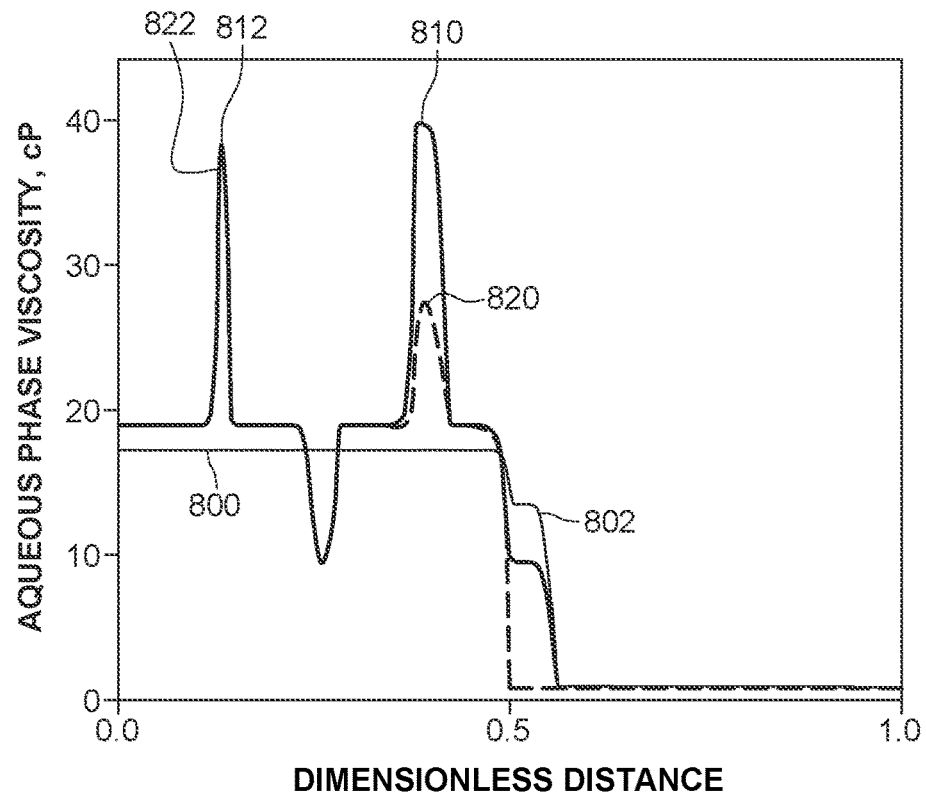
FIG. 8 illustrates the aqueous phase viscosity of the cases discussed in FIGS. 6A to 6C as a function of a distance from the injection well.

FIG. 8 illustrates the polymer solution viscosity profiles for the cases considered in FIGS. 6A to 6C. The viscosity 800 for the continuous case (illustrated in FIG. 6A) is constant for most of the distance, except for the polymer at the front of the injection, which accelerates into the high salinity reservoir brine, and thus its viscosity drops to a lower value 802.

The process of FIG. 5 that uses compositionally-tuned slugs, which corresponds to FIG. 6B, shows the formation of two viscosity peaks 810 and 812 at the interface between the trailing and leading slugs for a given cycle. For the case of compositionally-tuned slugs with adsorption (FIG. 6C), the viscosity of the first peak 820 is lower than the one (peak 810) obtained in the case without adsorption. However, it is noted that for the second cycle, the peak viscosities 812 and 822 for the compositionally-tuned slugs without and with adsorption, respectively, overlap, meaning that at that location, the adsorption has been satisfied.

Figure 9:
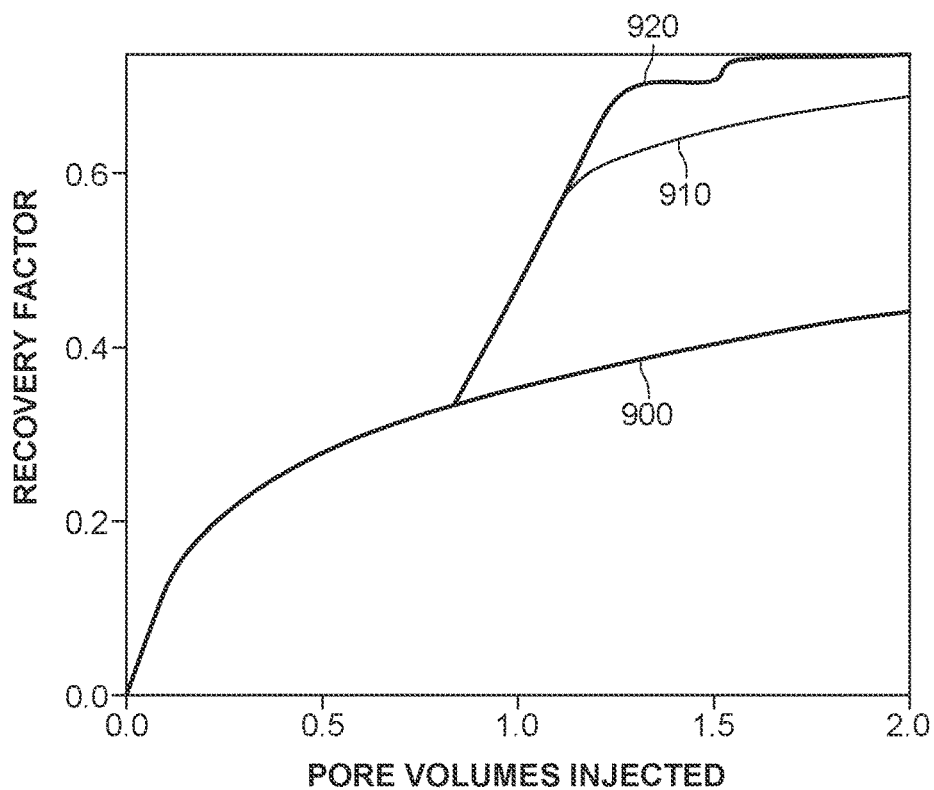
FIG. 9 illustrates a recovery factor of the oil from the reservoir for the cases illustrated in FIGS. 6A to 6C.

FIG. 9 illustrates the oil recovery factor (on y axis) as a function of injected pore volumes (on x axis) corresponding to (1) traditional water flooding with no polymer (curve 900), (2) traditional continuous polymer flooding (curve 910), and (3) novel compositionally-tuned slugs (curve 920). It is noted that the injection of the proposed compositionally-tuned slugs has a clear economic incentive because by using the same amount of chemicals (i.e., similar costs) the process is able to deliver higher recovery of oil for the same time.

Figure 10:
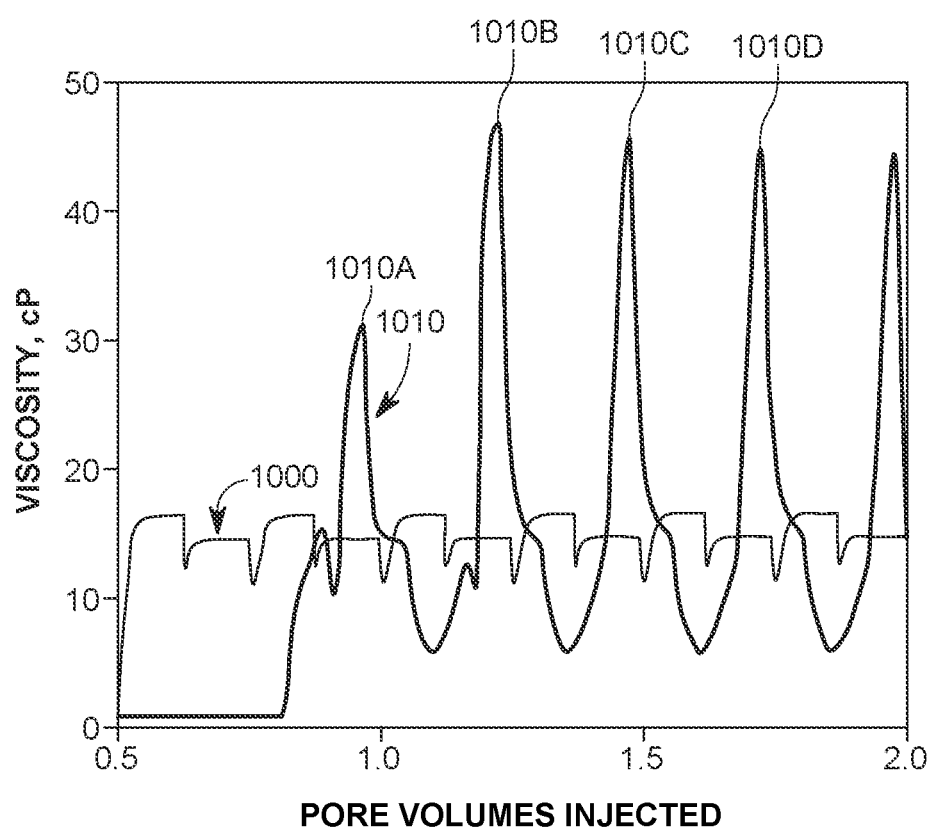
FIG. 10 illustrates the viscosity of the slugs as a function of injection time close-by and far-away from the injection well.

FIG. 10 shows the changes in the polymer solution viscosity (y axis) as a function of time (x axis) for the novel compositionally-tuned slug injection process at two different locations: (1) near the injection point or well (see curve 1000) and (2) far away from the injection point or well (see curve 1010). The results in this figure show that near the injection point, the viscosity 1000 is very close to the injected viscosities, meaning that the polymer has not had enough time in the rock to move ahead of its corresponding salinity, as is desired. However, far away from the injection point, that is no longer the case and it can be seen the large viscosities peaks 1010A to 1010D, which means that the viscosity has increased beyond the one used for injection, and the sweep of the oil is improved.

Two-dimensional and three-dimensional studies have also been performed for testing the efficiency of the new slug-based polymer injection process. The results of these experiments indicate that this new process has the potential to boost oil recovery over conventional continuous polymer flooding, and also, to preserve polymer injectivity while achieving higher polymer solution viscosity in situ using the same mass of the chemicals. It was further observed that:

In terms of polymer solution rheology, this technology benefits from polymers whose viscosity can be controlled by changing the salt concentration. Both partially hydrolyzed polyacrylamides and associative polymers are good candidates;

In terms of polymer transport through porous media, this technology benefits from polymer-rock candidates that have low adsorption, low salinity-induced adsorption changes, and high inaccessible pore volume. This combination would result in high polymer acceleration for both the leading and trailing slugs.

For a fixed polymer-rock system, the process can be optimized in terms of the composition of the slugs and cycle size. Well-spacing is another design variable because the transition zone increases with increasing the travelled distance, but so does the polymer loss to both adsorption and degradation.

Figure 11:
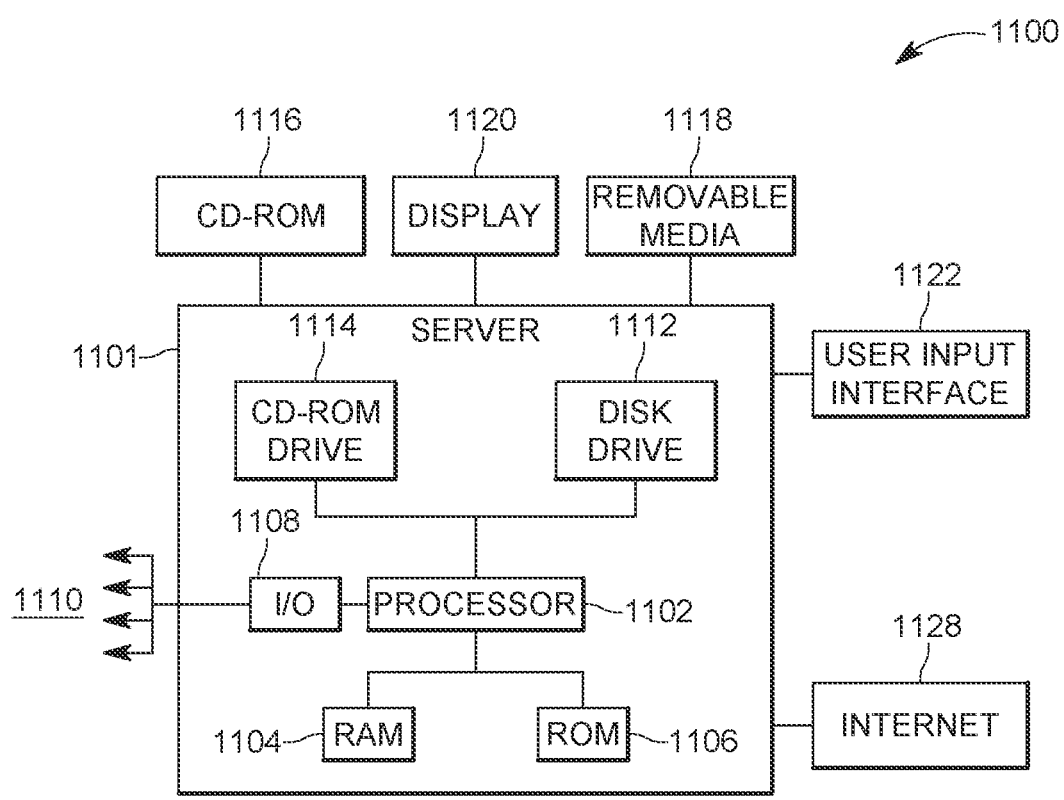
FIG. 11 is a schematic diagram of a controller for performing the injection of the first and second slugs into the injection well.

The above-discussed procedures and methods may be implemented within a computing device as illustrated in FIG. 11. Hardware, firmware, software or a combination thereof may be used to perform the various steps and operations described herein.

Computing device 1100 (which corresponds to controller 270 in FIG. 2), which is suitable for performing the activities described in the above embodiments, may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. Processor 1102 carries out a variety of functions as are known in the art, as dictated by software and/or firmware instructions.

Server 1101 may also include one or more data storage devices, including hard drives 1112, CD-ROM drives 1114 and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as sources, detectors, etc. The server may be part of a larger network configuration as in a global area network (GAN) such as the Internet 1128, which allows ultimate connection to various landline and/or mobile computing devices.

The disclosed embodiments provide a system and method for oil reservoir recovery that uses compositionally-tuned slugs. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for selecting and injecting compositions of first and second slugs into an underground formation, the method comprising:
   selecting a first salinity and a first polymer concentration for a first slug to be injected into a well;

selecting a second salinity and a second polymer concentration for a second slug to be injected into the well;
injecting the first slug into the well; and
injecting the second slug into the well,
wherein the second slug is injected immediately after the first slug, and
wherein each of the first and second polymer concentrations are selected so that corresponding viscosities of the first and second plugs are smaller than a limit viscosity $V_{LIMIT}$ associated with a pump that pumps the first and second slugs, and a polymer viscosity in a mixing zone in the underground formation, where a part of the first slug mixes with a part of the second slug, is higher than the limit viscosity $V_{LIMIT}$ associated with the pump.

2. The method of claim 1, wherein the first salinity is different from the second salinity.

3. The method of claim 1, wherein the first salinity is lower than the second salinity.

4. The method of claim 3, wherein the second salinity is equal to a salinity of the underground formation.

5. The method of claim 1, wherein the first polymer concentration is different from the second polymer concentration.

6. The method of claim 1, wherein the first polymer concentration is smaller than the second polymer concentration.

7. The method of claim 6, wherein the first polymer concentration is zero.

8. The method of claim 1, wherein each of the first slug and the second slug includes a solution, and the solution is made up of water, salt particles and at least one polymer.

9. The method of claim 8, wherein the at least one polymer has a viscosity that decreases with an increase of a salinity of the solution.

10. The method of claim 9, wherein the at least one polymer has a viscosity that increases with an increase of a polymer concentration in the solution.

11. A system for sweeping a fluid from an underground formation, the system comprising:
a processor configured to,
select a first salinity and a first polymer concentration for a first slug to be injected into a well, and
select a second salinity and a second polymer concentration for a second slug to be injected into the well; and
a pump controlled by the processor and configured to,
inject the first slug into the well; and
inject the second slug into the well,
wherein the second slug is injected immediately after the first slug, and
wherein each of the first and second polymer concentrations are selected so that corresponding viscosities of the first and second plugs are smaller than a limit viscosity $V_{LIMIT}$ associated with the pump, and a polymer viscosity in a mixing zone in the underground formation, where a part of the first slug mixes with a part of the second slug, is higher than the limit viscosity $V_{LIMIT}$ associated with the pump.

12. The system of claim 11, wherein the first salinity is different from the second salinity.

13. The system of claim 11, wherein the first salinity is lower than the second salinity and the second salinity is equal to a salinity of the underground formation.

14. The system of claim 11, wherein the first polymer concentration is different from the second polymer concentration.

15. The system of claim 11, wherein the first polymer concentration is smaller than the second polymer concentration.

16. The system of claim 11, wherein each of the first slug and the second slug includes a solution, and the solution is made up of water, salt particles and at least one polymer.

17. The system of claim 16, wherein the at least one polymer has a viscosity that decreases with an increase of a salinity in the solution.

18. The system of claim 17, wherein the at least one polymer has a viscosity that increases with an increase of a polymer concentration in the solution.

19. A method for selecting and injecting compositions of first and second slugs that are injected into an underground formation, the method comprising:
selecting a first salinity and a first, non-zero polymer concentration for a first slug to be injected into a well;
selecting a second salinity and a second, non-zero polymer concentration for a second slug to be injected into the well;
injecting the first slug into the well; and
injecting the second slug into the well, wherein the second slug is injected immediately after the first slug and
wherein each of the first and second polymer concentrations are selected so that corresponding viscosities of the first and second plugs are smaller than a limit viscosity $V_{LIMIT}$ associated with a pump that pumps the first and second slugs, and a polymer viscosity in a mixing zone in the underground formation, where a part of the first slug mixes with a part of the second slug, is higher than the limit viscosity $V_{LIMIT}$ associated with the pump.

* * * * *